July 2, 1940.   C. STERN   2,206,294
DEVICE FOR THE PROGRESSIVE TEACHING OF ARITHMETIC
Filed May 31, 1939
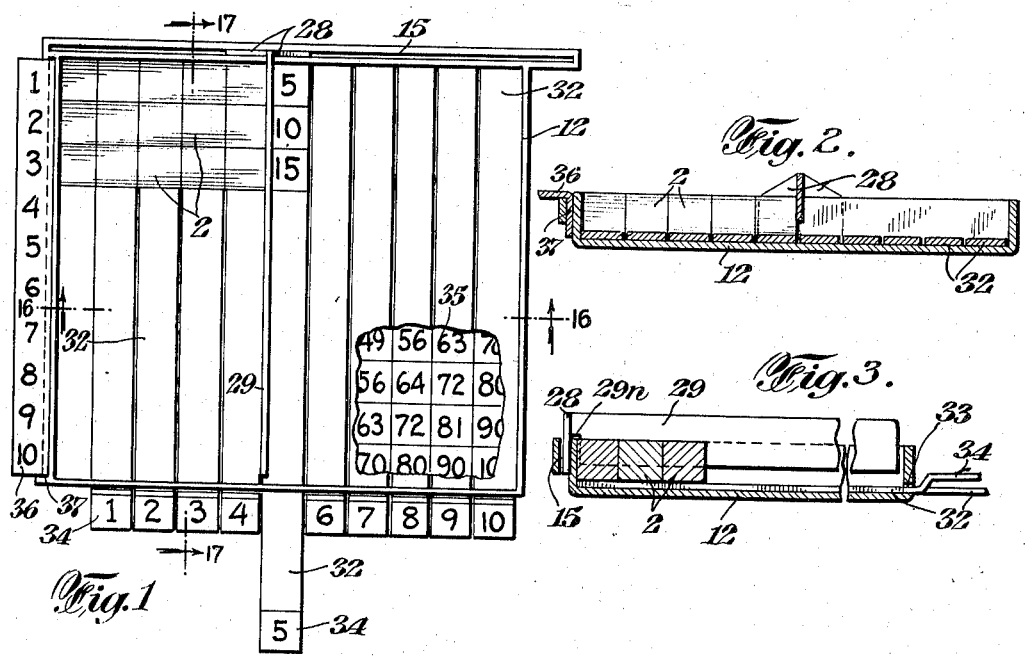
INVENTOR
*Catherine Stern*
BY *Jacob Schechter*
ATTORNEY Patented July 2, 1940

2,206,294

UNITED STATES PATENT OFFICE 2,206,294

DEVICE FOR THE PROGRESSIVE TEACHING OF ARITHMETIC

Catherine Stern, New York, N. Y.

Application May 31, 1939, Serial No. 276,520

6 Claims. (Cl. 35—31)

The device of this application is used in progressively teaching rudimentary arithmetic principles from the most elementary concepts—such as counting, and the ten arithmetic symbols from "0" to "9" and their quantity significance—to the more advanced arithmetic processes of division and multiplication.

The device of this invention is based upon visualization (and object lessons and activity, as will be explained hereinafter) of every step of the teaching process, as distinguished from memorization. For example, the child is not taught to repeat that two and two make four a great many times to impress this upon his mind so that he comes to know the result by force of memory. Instead, the child, by creative work and object lessons and activity—using concrete quantity units (blocks) and other equipment and devices of this application, as will be fully explained herein—actually sees and visualizes that two and two are four. Taking a somewhat more advanced problem, when the pupil is taught, for example, that four goes into thirty-seven eight times and five over, it is difficult for the pupil to comprehend; he merely learns the exercise by rote. As will be seen, in the system of this invention, the child sees clearly just what this process of division involves, by actual concrete example and handling.

For the attainment of these objects of my invention and such other objects as may appear or be pointed out, I have shown one exemplification of my invention in the accompanying drawing wherein:

Fig. 1 is a plan view of the "multiplication board," used in teaching the multiplication and division processes;

Fig. 2 is a section on the line 16—16 of Fig. 1; and

Fig. 3 is a section on the line 17—17 of Fig. 1.

After the child has progressed so far as to recognize the Arabic numerals in their sequence, their quantity significance, the meaning of odd, even, etc., the child is taught multiplication and division. For these and other purposes I have devised what I have termed the "multiplication board" 12, Fig. 1, which is in the form of a shallow dish, see Figs. 2 and 3, ten units wide (vertically measured in the drawing, Fig. 1) and eleven units long. The dished board 12 is sufficiently deep to receive the number sticks 2. Along the upper edge, Fig. 1, of the board is a long slot 15 in which is slidably received a downturned portion 28 provided at the upper end of a guide member 29, which is notched 29n, see Fig. 3 to fit over the wall of the dished board 12. Guide member, 29, which extends substantially the width of the board, see Fig. 1, may be moved along the length of the board, sliding in its slot 15, to mark off different number of units between itself and the left wall of the board; in Figs. 1 and 2, this is five (5) units. The guide member will be retained where placed by reason of the frictional engagement of the guide member, rather, its end portion 28, in the slot 15.

Oriented across the width of the board (vertically of the drawing, Fig. 1) are a plurality of masking strips 32—ten in number—which are arranged in side by side relation along the length of the board (horizontally of the drawing, Fig. 1). The strips 32 extend through a slot 33 provided along the lower wall of the board, see Fig. 3; the exposed ends 34, Fig. 1, of the strips serve as a means for grasping them individually and pulling them from the board (as will be explained). The exposed strip ends 34 also serve to bear numerals from "1" to "10." Underlying the series of close-together strips 32 is a number sheet 35 which presents a schedule of numbers in column and row tabulation (soon explained).

It will be observed from Fig. 1 that, in addition to the ten strips 32, each one of which is substantially as wide as a single block or stick unit, there is a space along the left wall of the board which is equal to this unit; the length of the board is thus eleven units. The purpose of providing this extra space is due to the fact that the length of the number stick is read by means of the numbers of the number chart 35 in the column just to the right of the ends of the sticks, this column of numbers being exposed by withdrawing the strip 32, which is likewise just to the right of the sticks. For example, the board in Fig. 1 has been set, by adjusting guide 29 lengthwise, to receive sticks that are 5 units in length between the guide and the left wall of the board. The number of units represented by the sticks placed in the board is read by withdrawing the strip 32 which is just to the right of the guide (and to the right of the sticks). (In the example shown in Fig. 1, this is the fifth strip from the left, but really the sixth space, since, as mentioned, the extra unit space at the left wall of the board has no strip). The column (vertical) of figures of the number chart 35 which underlie the fifth strip are in multiples of 5, the top number being 5.

The board is used in the following manner:— the first stick (of 5 units, in the example being considered) is placed between the guide and the left wall of the board and close to the upper edge of the board. The strip "5" is withdrawn one unit, to expose the number "5" which indicates that the total number or units of the stick placed in the board is five. The next stick, also of five units is placed against the first stick and strip #5 withdrawn another unit to expose the number "10", thus representing that there are now a total of ten units contained in the sticks placed in the board. In Fig. 1, there are three sticks each 5 units in length, totaling to "15" as shown. By thus placing the 5 unit stick in the board and correspondingly withdrawing the "5" masking strip, the child learns not only that 5 plus 5 equals 10, but that 2 times 5 equals 10; 3 times 5 equals 15, etc.

To aid in the counting of the number of sticks or to check this, there is provided an indicating member 36 in the form of an inverted L, Fig. 2, the vertical leg of which fits in a long slot 37 provided along the left edge of the board. The horizontal leg of the member bears a column of numerals from "1" to "10." The indicating member may be thus removed when it is desired that the child itself count the number of sticks.

The multiplication board may be used in teaching division, which might be best explained by way of an example. Suppose it is desired to explain the process of dividing "39" by "4." The guide 29 is adjusted four units from the left edge of the board so that four unit sticks may be inserted between wall and guide; the #4 masking strip, which is just to the right of the guide, is then withdrawn to uncover the number nearest to "39", which is, of course, "36" (9×4). The child then proceeds to place as many 4 unit sticks in the board between left wall and guide until the total number of units, as indicated on masking strip #4, reaches 36; the number of sticks is, of course, 9 (which may be seen from indicating member 36, if that is used). The child then proceeds to place single unit blocks counting from "37" to "39", that is, three blocks. In this way, the child visualizes that 4 goes into 39, 9 times (because of the 9 sticks of 4 units each) and that there is a remainder of 3 (as shown by the 3 individual unit blocks).

The multiplication board may be used with individual blocks each of a single unit, instead of with varied length sticks. For example, the child might be given the problem of determining how many times 5 goes into 25. In this case the guide member 29 is placed at 5 units and the #5 masking strip withdrawn to expose the number "25." The child proceeds to fill in the area at the upper left corner between left wall and guide; this corner will, of course, be completely covered by 25 blocks, making 5 rows each 5 blocks long. The child thus learns that 5 goes into 25, 5 times. The process may be carried further to teach the division of numbers leaving a remainder (as in the first example, using number sticks). For example, by using 27 blocks, the child will visualize that 2 blocks remain after the division of 5 into 27.

I claim:

1. In a device of the class described employing number sticks of multiple unit lengths, the combination of a dished board, the side walls of which are 10 units in length and spaced apart 11 units, a number chart comprising 10 columns of numbers arranged parallel to the said side walls, each column presenting multiples of a number corresponding to the unit position of the particular column from the left wall of the board, the first column (of multiples of "1") being spaced one unit from the said left wall, a plurality of 10 masking strips overlying the said chart and arranged parallel to, and coincidental with, the said multiple columns, and a guide member extending parallel to the said columns and masking strips and adapted to be adjusted relative to the said left side wall to regulate the unit length of the said number sticks receivable in the dished board between the guide member and the said side wall, the masking strip just to the right of the end of the number stick and the guide member adapted to be withdrawn to expose the multiple column corresponding to the unit length of the said stick, the exposed number of the said chart depending upon the number of units of the stick and the number of sticks placed in the board.

2. In a device of the class described employing number sticks of multiple unit lengths, the combination of a substantially square dished board adapted to receive a plurality of the said sticks up to a length of 10 units and up to a total of ten sticks, a guide member extending parallel to the side walls of the dished board and adapted to be adjusted relative to the left side wall of the board to regulate the unit length of the said number sticks receivable in the said dished board between the guide member and the said side wall, a number chart comprising columns of numbers arranged parallel to the said side walls, each column presenting multiples of a number corresponding to the unit position of the particular column from the said left wall, and a plurality of masking strips overlying the said chart and arranged parallel to, and coincidental with, the said multiple columns, the said strips adapted to be individually withdrawn to expose its underlying multiple column.

3. In a device of the class described employing number sticks of multiple unit lengths, the combination of a substantially square dished board adapted to receive a plurality of the said sticks up to a length of 10 units and up to a total of ten sticks, a guide member extending parallel to the side walls of the dished board and adapted to be adjusted relative to the left side wall of the board to regulate the unit length of the said number sticks receivable in the said dished board between the guide member and the said side wall, a number chart comprising columns of numbers arranged parallel to the said side walls, each column presenting multiples of a number corresponding to the unit position of the particular column from the said left wall, and a plurality of masking strips overlying the said chart and arranged parallel to, and coicidental with, the said multiple columns, the said strips adapted to be individually withdrawn to expose its underlying multiple column, the lower wall of the dished board being slotted for passage of the said masking strips and an end portion of the said strips extending in normal position beyond the board, whereby individual strips may be grasped and withdrawn.

4. In a device of the class described employing number sticks of multiple unit lengths, the combination of a substantially square dished board adapted to receive a plurality of the said sticks up to a length of 10 units and up to a total of ten sticks, a guide member extending parallel to the side walls of the dished board and adapted to be adjusted relative to the left side wall of the board to regulate the unit length of the said number sticks receivable in the said dished board between the guide member and the said side wall, and a number chart comprising columns of numbers arranged parallel to the said side walls, each column presenting multiples of a number corresponding to the unit position of the particular column from the said left wall.

5. In a device of the class described employing number sticks of multiple unit lengths, the combination of a substantially square dished board adapted to receive a plurality of the said sticks up to a length of 10 units and up to a total of ten sticks, and a guide member extending parallel to the side walls of the dished board and adapted to be adjusted relative to the left side wall of the board to regulate the unit length of the said number sticks receivable in the said dished board between the guide member and the said side wall.

6. In a device of the class described employing number sticks of multiple unit lengths, the combination of a dished board substantially square in dimensions and adapted to receive a plurality of the said sticks up to a length of 10 units and up to a total of ten sticks, and a guide member adapted to be adjusted in the said board to regulate the unit length of the said number sticks receivable in the said dished board.

CATHERINE STERN.